United States Patent [19]

Inoue

[11] Patent Number: 5,404,466
[45] Date of Patent: Apr. 4, 1995

[54] APPARATUS AND METHOD TO SET AND RESET A PIPELINE INSTRUCTION EXECUTION CONTROL UNIT FOR SEQUENTIAL EXECUTION OF AN INSTRUCTION INTERVAL

[75] Inventor: Kazuhisa Inoue, Tokyo, Japan

[73] Assignee: NEC Corporation, Tokyo, Japan

[21] Appl. No.: 229,136

[22] Filed: Apr. 18, 1994

Related U.S. Application Data

[63] Continuation of Ser. No. 022,760, Feb. 22, 1993, abandoned, which is a continuation of Ser. No. 537,304, Jun. 13, 1990, abandoned.

[30] Foreign Application Priority Data

Jun. 13, 1989 [JP]  Japan ................................ 1-148269

[51] Int. Cl.⁶ .............................................. G06F 9/38
[52] U.S. Cl. .................................. 395/375; 395/425; 364/DIG. 1; 364/247.3
[58] Field of Search .......................... 395/375, 425; 364/200 MS File, 900 MS File

[56] References Cited

U.S. PATENT DOCUMENTS

| | | | |
|---|---|---|---|
| Re. 34,052 | 9/1992 | Hester et al. ........................ | 395/375 |
| 4,161,026 | 7/1979 | Wilhite ................................ | 364/200 |
| 4,212,060 | 7/1980 | Prey ..................................... | 395/375 |
| 4,251,859 | 2/1981 | Momose et al. ..................... | 364/200 |
| 4,274,138 | 6/1981 | Shimokawa ......................... | 395/800 |
| 4,409,654 | 10/1983 | Wada et al. ......................... | 395/725 |
| 4,539,635 | 9/1985 | Boddie et al. ....................... | 395/775 |
| 4,594,655 | 6/1986 | Hao et al. ............................ | 395/775 |
| 4,630,195 | 12/1986 | Hester et al. ........................ | 395/375 |
| 4,782,441 | 11/1988 | Inagami et al. ..................... | 395/800 |
| 4,803,620 | 2/1989 | Inagami et al. ..................... | 395/375 |
| 4,947,316 | 8/1990 | Fisk et al. ............................ | 364/200 |
| 5,073,970 | 12/1991 | Aoyama et al. ..................... | 395/800 |

FOREIGN PATENT DOCUMENTS 0042442  12/1981  European Pat. Off. .

*Primary Examiner*—Joseph L. Dixon
*Assistant Examiner*—Frank J. Asta
*Attorney, Agent, or Firm*—Foley & Lardner

[57] ABSTRACT

An execution control system for use in a pipeline instruction execution control type information processing device, wherein an instruction interval is executed sequentially after completion of a certain instruction used in, for example, a debugging process and before reading out a next instruction. The execution control system is part of an information processing device which has a pipeline instruction execution control portion. The instruction execution control system has a program status word holding unit for holding a program status word. The program status word includes information indicating whether or not an instruction interval is to be sequentially executed as well as information indicating execution status of a program. The instruction execution control system also has an instruction execution sequencing indicating unit which indicates to the instruction execution control portion whether or not the instructions in the instruction interval are to be sequentially executed.

2 Claims, 5 Drawing Sheets

"PSB" - PROCESS STATUS BLOCK
"BSP" - BASIC PROCESS STATUS

APPARATUS AND METHOD TO SET AND RESET A PIPELINE INSTRUCTION EXECUTION CONTROL UNIT FOR SEQUENTIAL EXECUTION OF AN INSTRUCTION INTERVAL

This application is a continuation of application Ser. No. 08/022,760, filed Feb. 22, 1993, now abandoned, which is a continuation of application Ser. No. 07/537,304, filed Jun. 13, 1990, now abandoned.

BACKGROUND OF THE INVENTION

The present invention relates to an execution control system for use in a pipeline instruction execution control type information processing device, in which an instruction interval between completion of a certain instruction used in, for example, a debugging process and a readout of a next instruction, is executed by sequencing them.

Sequential control, a basic scheme of execution control, operates in steps of reading out decoding, and executing an instruction, and then, reading out a next instruction.

On the other hand, an execution control using a pipeline system is performed as follows: an instruction which is considered as necessary in the future or an instruction which has been executed recently is stored in an instruction buffer, and the instruction is fetched ahead. The fetched instruction is partially decoded, a portion of processing is performed in parallel to an execution of a current instruction, several instructions are preproccessed in parallel simultaneously. A system for executing instructions between completion of execution of a certain instruction and a readout of a next instruction is usually used in debugging. Therefore, the execution is controlled by an indication from a service processor.

It is assumed in the pipeline instruction execution control type information processor that a program exception occurs during execution of a program. Since, in the information processor of this type, a plurality of instructions are executed in parallel and simultaneously by the pipeline system, it is difficult to identify a program in which such program exception occurred.

Even in a conventional system for sequentially executing the instructions, an instruction execution control portion is indicated through the service processor to execute these instructions sequentially. Hence, the instruction interval is executed sequentially by the information processing device as a whole. Hence when a plurality of programs are being processed by the information processing device, it is impossible to sequentially execute the instruction interval in only a desired portion of a specific program.

SUMMARY OF THE INVENTION

An object of the present invention is to eliminate the above mentioned problem by providing an instruction execution control system, by which an instruction in which program exception occurs, can be easily identified and a sequential execution of instruction interval between a completion of execution of a certain instruction and a read of a next instruction only within a desired portion of a specific program can be easily performed.

According to an aspect of the present invention, an instruction execution control system of an information processing device having a pipeline instruction execution control portion, for sequentially executing an instruction interval between a completion of execution of a certain instruction and a read of a next instruction, comprises program status word holding unit for holding a program status word including indicating information which indicates whether or not an instruction interval is to be sequentially executed and control information indicating execution status of a program, and instruction execution sequencing indicating unit responsive to the indicating information of the program status word held in the program status word holding unit for indicating to the instruction execution control portion whether or not the instructions in the instruction interval are to be sequentially executed.

BRIEF DESCRIPTION OF THE DRAWING

Other features, constructions and advantages of the present invention will become apparent from reading the following description with reference to the accompanying drawings in which same or corresponding components are depicted by same reference numerals, respectively, and in which.

PREFERRED EMBODIMENTS

Figure 1:
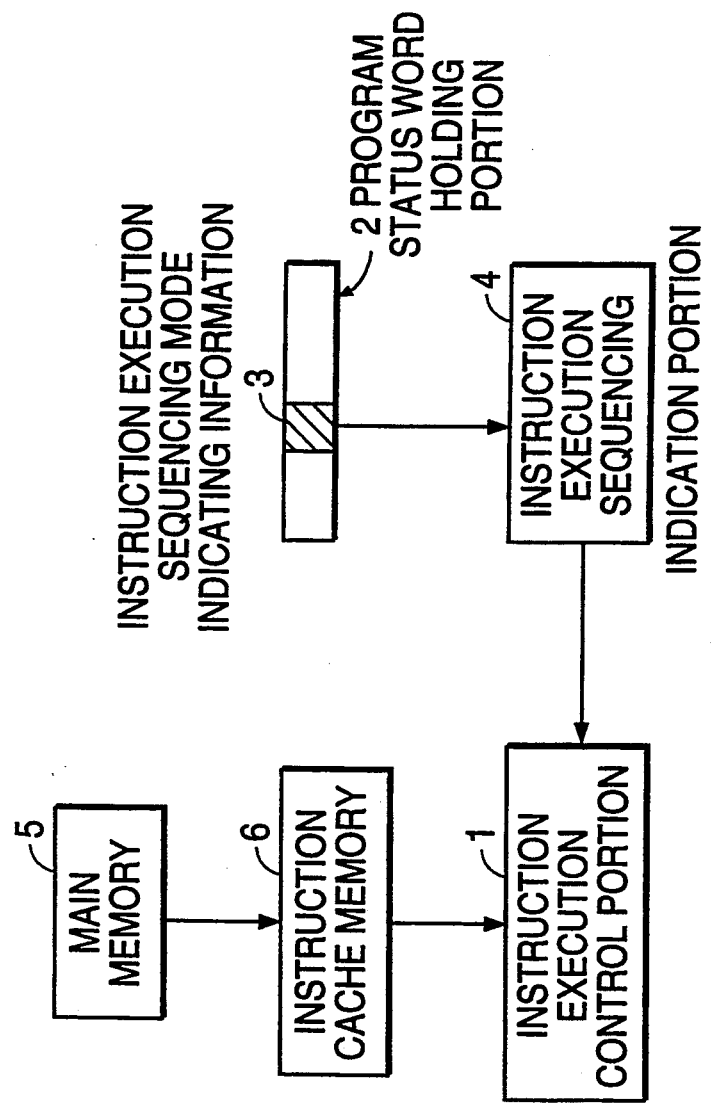
FIG. 1 shows a system to which an embodiment of the present invention is applied.

Referring to FIG. 1, a system to which an embodiment of the present invention is applied includes a main memory 5 for storing at least an instruction word or data, an instruction cache memory 6 for storing at least a portion of a copy of the instruction word stored in the main memory 5, an instruction execution control portion 1 for executing an instruction fetched from the instruction cache memory 6 by means of a pipeline system, a program status word holding portion 2 containing an instruction execution sequencing mode indicating information 3 for holding a control information indicative of an execution status of a program as a program status word and an instruction execution sequencing indication portion 4 responsive to a content of the instruction execution sequencing mode instruction information 3 of the program status word held in the program status word holding portion 2 for indicating to the instruction execution control portion 1 to sequentially execute an instruction interval between a completion of execution of a certain instruction and a read of a next instruction.

Figure 2:
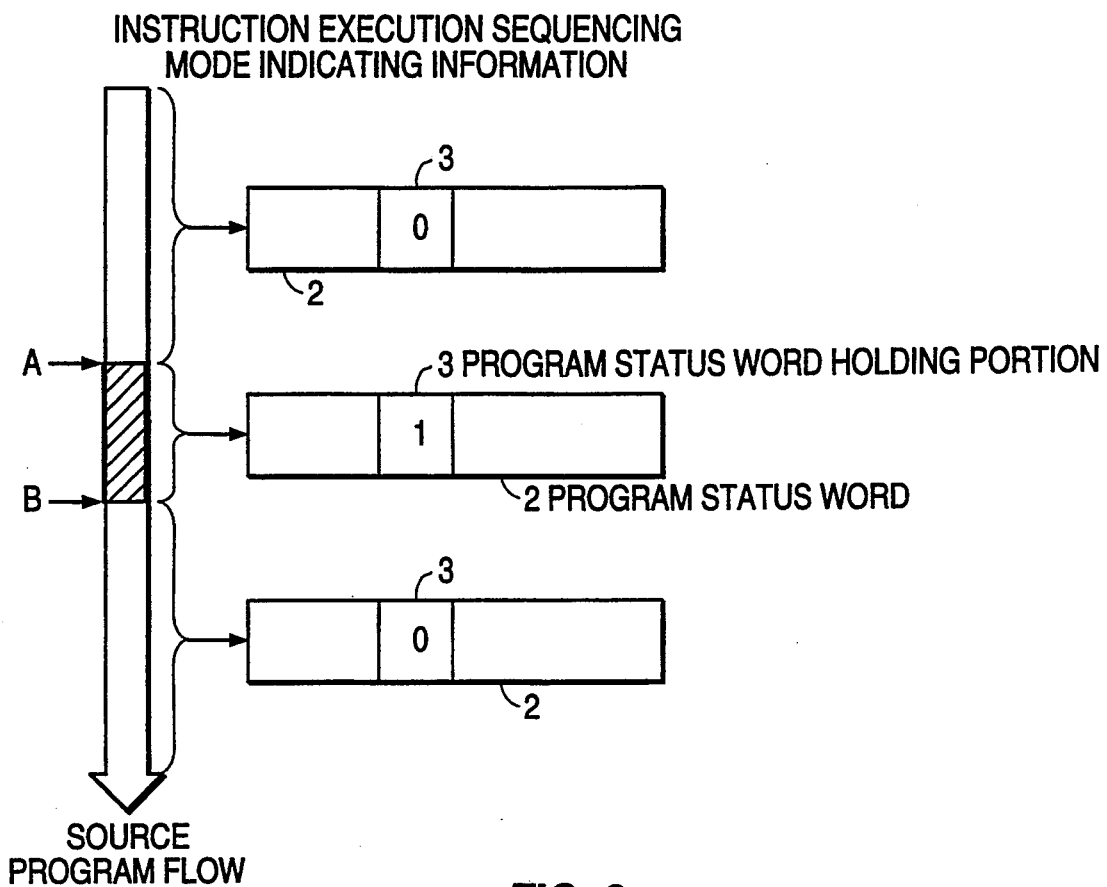
FIG. 2 shows a relationship between a flow of a program and a content of an instruction execution sequencing mode indicating information 3 held in a program status word holding portion 2.

Referring to FIG. 2, a relation between a source program flow and the content of the instruction execution sequencing mode indicating information 3 held in the program status word holding portion 2 is shown. When it is desired to sequentially execute the instruction interval within a period between points A and B on the source program flow, it is enough, in the present invention, to set the instruction execution sequencing mode indicating information 3 in the program status word holding portion 2 to a logical "1".

The setting of the instruction execution sequencing mode indicating information 3 to "1" can be performed by either of the following two methods.

The first method will be described in detail with reference to FIGS. 2, 3 and 5.

Figure 3:
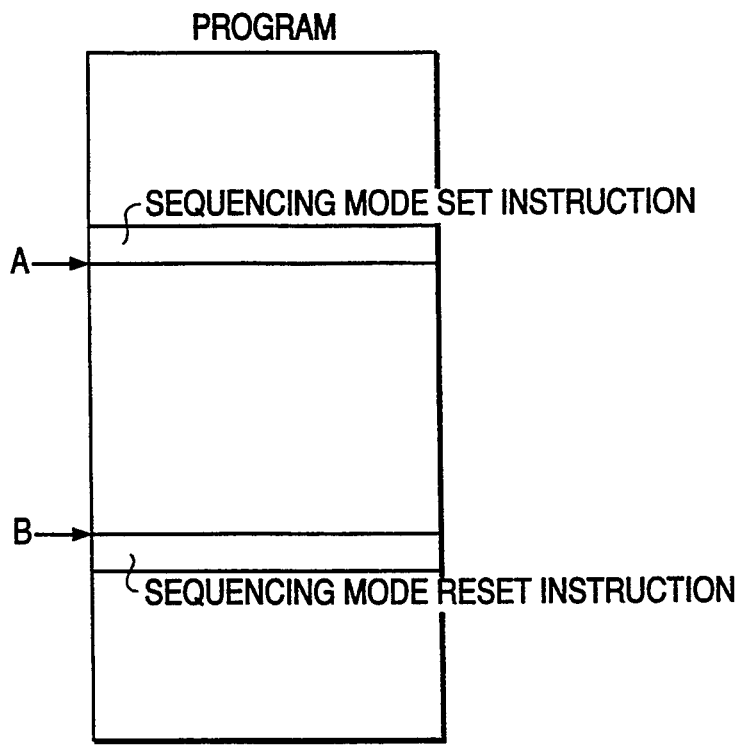
FIG. 3 is a diagram showing positions on the program in FIG. 2 to which a sequencing mode setting instruction and a sequencing mode resetting instruction are inserted.

When the instruction interval is to be sequentially executed in the period between the points A and B on the source program flow shown in FIG. 2, a sequencing mode setting instruction and a sequencing mode resetting instruction are inserted into the points A and B of the program shown in FIG. 3, respectively.

Figure 5:
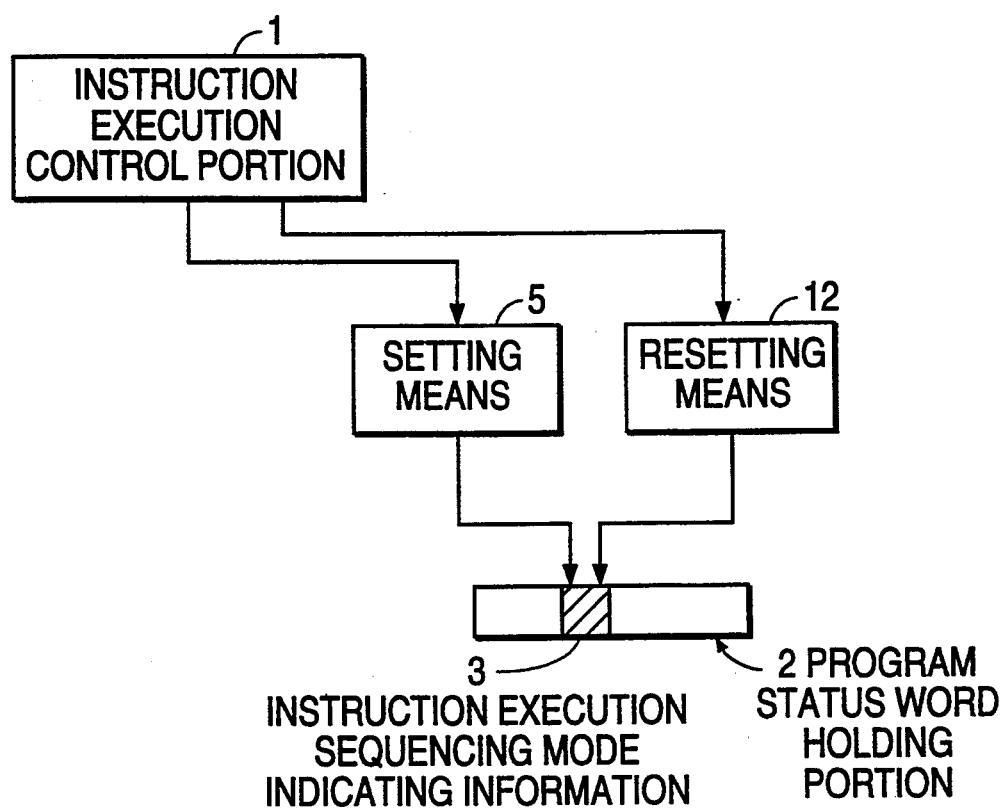
FIG. 5 shows a portion of an embodiment of the present invention.

Referring to FIGS. 3 and 5, when the sequencing mode setting instruction is executed in the instruction execution control portion 1, the instruction execution sequencing mode indicating information 3 in the program status word holding portion 2 is set to "1" by a setting means 11. Upon this "1" state of the sequencing mode indicating information 3, the instruction execution sequencing indicating portion 4 sends an instruction to the instruction execution control portion 1. The instruction execution control portion 1 is set to an instruction execution sequencing mode by this instruction and the instruction interval is then sequentially executed.

Further, when the source program is executed up to the point B in FIG. 3, the sequencing mode resetting instruction is executed. In response to this execution, the instruction execution sequencing mode indicating information 3 in the program status word holding portion 2 is changed to "0". With this change of the status to "0", the instruction sequencing indication portion 4 indicates to the instruction execution control portion 1 to reset the instruction execution sequencing mode. Upon this instruction, the instruction execution control portion 1 pipelines the instruction interval and executes it.

The second method for setting the instruction execution sequencing mode indicating information 3 will be described in detail with reference to FIGS. 2, 4 and 6.

Figure 4:
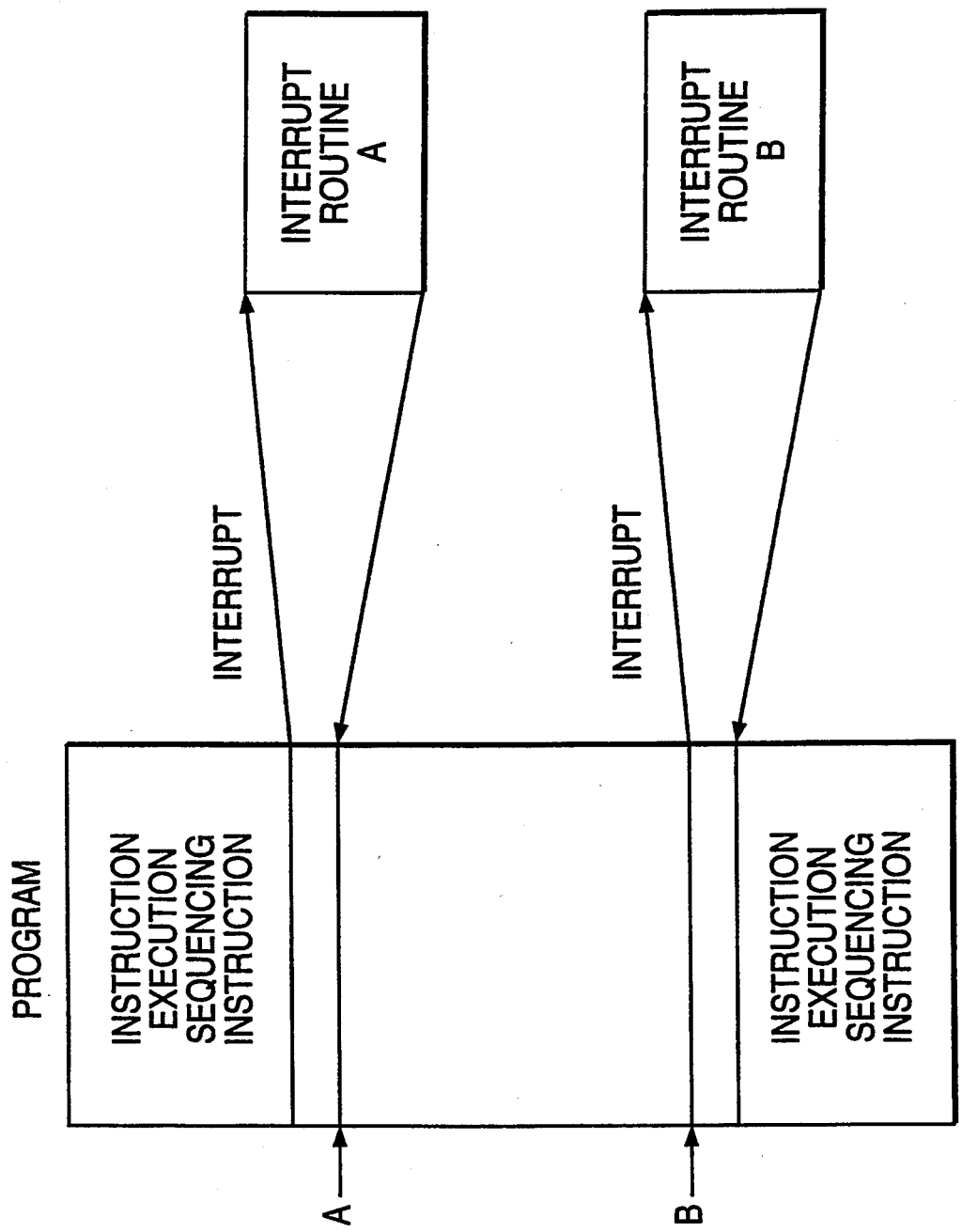
FIG. 4 is a diagram showing positions on the program in FIG. 2 to which instruction execution sequencing instructions are inserted.

When the instruction interval is sequentially executed in the period between the points A and B on the source program flow shown in FIG. 2, instruction execution sequencing instructions are inserted into the points A and B of the source program flow shown in FIG. 4.

The source program is compiled by a compiler upon a detection of the instruction execution sequencing instruction such that interrupt routines A and B are called at the points A and B on the source program flow. These interrupt routines are those for switching the mode of sequencing and execution of the instruction interval.

Processing of the interrupt routine will be described in detail with reference to FIGS. 6A and 6B.

Figure 6A:
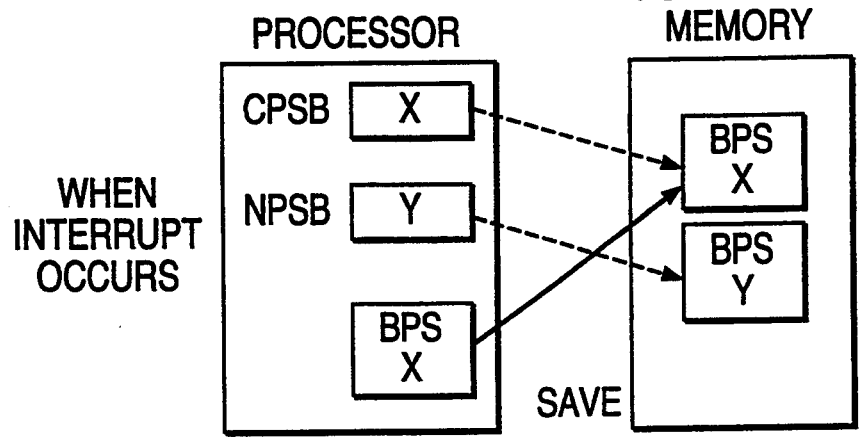
FIGS. 6A and 6B illustrate a processing sequence of an interrupt routine used in an embodiment of the present invention.

Referring to FIG. 6A, a basic process status (BPSX) is saved in a process status block (PSB) of a memory assigned by a current process status block address (CPSB).

Figure 6B:
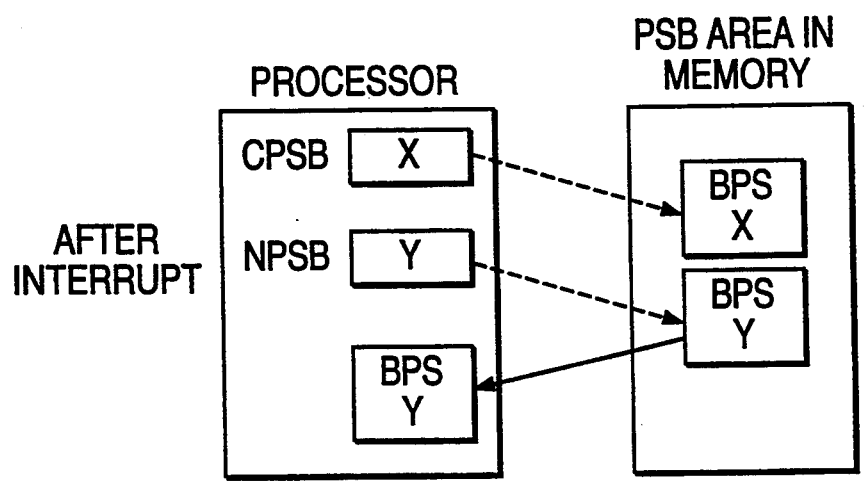

Referring to FIG. 6B, the basic process status (BPSY) is reloaded from the process status block (PSB) of the memory assigned by a next process status block address (NPSB). At this time, the program status word is contained in the basic process status (BPSX and BPSY), saved in the process status block (PSB) of the memory and reloaded.

Referring to FIGS. 6A and 6B, the interrupt routine A is to rewrite the content of the interval instruction sequencing mode indicating information 3 of the program status word in the basic process status (BPSX). The BPSX is saved at the calling time of the interrupt routine A by a called process to "1" so that the instruction interval is put into the sequencing and execution mode. At the same time, the basic process status (BPSX) is rewritten to the basic process status (BPSY) or an address (CPSB) of the BPSX is rewritten to an address (NPSB) of the BPSY. When control is returned to the called process, the basic process status (BPSY) is reloaded to the process and the saved program status word is recovered. At this time, the interval instructions sequencing mode indicating information 3 in the program status word indicates the instruction interval sequencing execution mode.

On the contrary, the interrupt routine B rewrites the interval instruction sequencing mode indicating information 3 in the program status word in the basic process status BPSX which is saved at the calling time of the interrupt routine B by the called process to a content indicating a mode in which the interval instruction is not sequentially executed. At the same time, the basic process status (BPSY) is shifted to the basic process status (BPSX) or an address (CPSB) of the BPSY is rewritten to an address (NPSB) of the BPSX. When the control is returned to the called process, the basic process status (BPSY) is reloaded to the process and the saved program status word is recovered. At this time, the interval instruction sequencing mode indicating information 3 of the program status word indicates a mode in which the instruction interval is not sequenced and executed.

By executing the compiled program shown in FIG. 4, the instruction interval is sequenced and executed in the period between the points A and B on the program.

According to the present invention, when a program exception occurs during execution of a program in a pipeline instruction execution control type information processing device, a plurality of instructions are executed in parallel and simultaneously by a pipeline system. Therefore, when it is necessary to identify a particular instruction in which the program exception occurs or when the instruction interval should be sequentially executed, the particular instruction can be easily identified without necessitating the sequencing and executing the instruction interval by the whole information processing device, by setting in the program status word an instruction information indicating whether or not the instruction interval is to be sequentially executed.

Even when a plurality of programs are being processed by the information processing device, the instruction interval can be sequentially executed in only a desired portion of a specific program.

What is claimed is:

1. A method for sequentially executing each instruction in an interval of instructions of a program in an information processing device having an instruction execution control portion normally utilizing a pipeline control, said interval of instructions being defined by a setting instruction and a resetting instruction in said program, said method comprising the steps of:

holding a program status word, said program status word including an indicating information which equals a first value when an instruction is to be sequentially executed and which equals a different value when said instruction is to be executed under said pipeline control, and a control information indicating an execution status of a program;

setting said indicating information to said first value when said setting instruction is executed;

indicating to said instruction execution control portion in response to said indicating information which equals said first value to carry out sequential execution;

sequentially executing said each instruction in said interval of instructions in a non-pipeline control such that said each instruction is read out, decoded and executed before a next instruction is read out; and resetting said indicating information to said different value when said resetting instruction is executed to resume said pipeline control.

2. An instruction execution control system for sequentially executing each instruction in an interval of instructions of a program in an information processing device having an instruction execution control portion normally utilizing a pipeline control, said interval of instructions being defined by a setting instruction and a resetting instruction in said program, said system comprising:

program status word holding means for holding a program status word including an indicating information, said indicating information having a first value when an instruction is to be sequentially executed and said indicating information having a different value when said instruction is to be executed using said pipeline control, and a control information showing an execution status of a program; and setting means, responsive to execution of said setting instruction in said instruction execution control portion, for setting said indicating information of said program status word holding means to said first value to indicate sequential execution of said each instruction in said interval of instructions in a non-pipeline control to said instruction execution control portion such that said each instruction is read out, decoded and executed before a next instruction is read out; and resetting means responsive to execution of said resetting indication in said instruction execution control portion for resetting said indicating information indicating to said instruction execution control portion to resume said pipeline control.

* * * * *